US005212888A

United States Patent [19]

Cary et al.

[11] Patent Number: 5,212,888

[45] Date of Patent: May 25, 1993

[54] DUAL FUNCTION SENSOR FOR A PEN PLOTTER

[75] Inventors: Paul D. Cary, Orange; Jeff T. Stapleton, Huntington Beach, both of Calif.

[73] Assignee: Calcomp Inc., Anaheim, Calif.

[21] Appl. No.: 760,564

[22] Filed: Sep. 16, 1991

[51] Int. Cl.⁵ ........................ B43L 13/00; G01D 15/16

[52] U.S. Cl. .................................. 33/18.1; 346/139 R

[58] Field of Search ..................... 33/18.1, 18.2, 23.11, 33/32.1, 32.2, 32.3, 34, 35, 1 M; 346/139 R, 139 C, 141, 49

[56] References Cited

U.S. PATENT DOCUMENTS

| | | | |
|---|---|---|---|
| 3,864,695 | 2/1975 | Nagashima et al. | 33/18.1 |
| 4,157,552 | 6/1979 | Nakajima | 33/18.1 |
| 4,288,798 | 9/1981 | Hollmayer | 33/18.1 |
| 4,496,958 | 1/1985 | Brandt et al. | 33/18.1 |
| 4,660,054 | 4/1987 | Kajikawa et al. | 346/139 R |
| 4,683,476 | 7/1987 | Ferrari et al. | 346/139 R |
| 4,777,727 | 10/1988 | Lawrence | 33/18.1 |
| 4,833,490 | 5/1989 | Zur | 346/139 R |
| 4,849,771 | 7/1989 | Lawrence et al. | 346/139 R |
| 4,862,592 | 9/1989 | Richard et al. | 33/18.1 |
| 4,885,701 | 12/1989 | Gunderson et al. | 346/139 R |

FOREIGN PATENT DOCUMENTS

| | | | |
|---|---|---|---|
| 0322307 | 6/1989 | European Pat. Off. | 33/18.1 |
| 0272969 | 11/1989 | German Democratic Rep. | 33/18.1 |
| 0216898 | 8/1989 | Japan | 33/18.2 |

*Primary Examiner*—Thomas B. Will

*Attorney, Agent, or Firm*—Donald A. Streck; Wm. F. Porter, Jr.

[57] ABSTRACT

In a pen plotter having a plotting head carrying one half of a pen exchanging mechanism including a holding plate pivotally attached to a plotting head for pivotal movement to raise and lower a pen gripped therein and carried thereby a spring-biased gripping finger pivotally carried by the holding plate for releasably holding a pen, this is a dual-function sensing apparatus for providing a single output signal indicating pen presence and pen up/down position. There is an optical sensor comprising a light source and a light detector separated from the light source by a space and having a sensing surface upon which a beam of light impinges and wherein the level of signal output is a function of the amount of light impinging on the sensing surface. There is a light blocking blade for selectively blocking portions of the beam of light and an activation linkage connected between the gripping finger and the light blocking blade for selectively blocking portions of the beam of light with the light blocking blade so that with no pen being held the signal output from the light detector is a first possible value, with a pen being held in a lowered position the signal output is a second possible value, and with a pen being held in a raised position the signal output is a third possible value.

4 Claims, 2 Drawing Sheets

DUAL FUNCTION SENSOR FOR A PEN PLOTTER

BACKGROUND OF THE INVENTION

This invention relates to pen plotters and sensors used therein for monitoring the functions thereof and, more particularly, in a pen plotter having a plotting head carrying one half of a pen exchanging mechanism including a holding plate pivotally attached to a plotting head for pivotal movement to raise and lower a pen gripped therein and carried thereby and a spring-biased gripping finger pivotally carried by the holding plate for releasably holding a pen, to a dual-function sensing apparatus for providing a single output signal indicating pen presence and pen up/down position; an optical sensor comprising a light source and a light detector separated from the light source by a space and having a sensing surface upon which a beam of light impinges and wherein the level of signal output is a function of the amount of light impinging on the sensing surface; a light blocking blade for selectively blocking portions of the beam of light; and, an activation linkage connected between the gripping finger and the light blocking blade for selectively blocking portions of the beam of light with the light blocking blade so that with no pen being held the signal output from the light detector is a first possible value, with a pen being held in a lowered position the signal output is a second possible value, and with a pen being held in a raised position the signal output is a third possible value.

In a pen plotter 10 having the portions depicted in FIG. 1, a pen 12 is releasably and exchangably held by a plotting head 14 moving back and forth on a beam 16 as indicated by the arrows 18. To effect line drawing and movement of the plotting head 14 from one vector position to another without drawing, the pen 12 is raised and lowered as indicated by the arrow 20. Typically, there is a pen exchanging station 22 at one end of the beam 16 to which the plotting head 14 can go to pick up a pen 12. Whether the pen exchanging station 22 has one pen 12 or a plurality of pens 12 held in a turret is not important. As depicted in FIG. 2, the pen exchanging station 22 includes one half of a pen exchanging mechanism, 24, and the plotting head 14 carries the other one half of the pen exchanging mechanism, 24'. The two halves of the pen exchanging mechanism 24, 24' each have a holding plate 26 containing a partial cylindrical groove 28 into which the pen 12 fits and a gripping finger 30 pivoted on its inner end and spring biased towards the groove 28. It is characteristic of the two halves of the pen exchanging mechanism 24, 24' that when one is holding a pen 12 and the two are brought together, the pen is exchange from the one to the other.

In prior art pen plotters employing such a mechanism, two sensors are employed to provide signals to the control logic (not shown) of the plotter 10. One sensor detects whether or not a pen 12 is being held by the other one half of the pen exchanging mechanism, 24' of the plotting head 14 so that plotting will not be commenced if there is no pen 12 with which to plot. The other sensor is positioned to detect when the pen 12 is in its raised and lowered positions so that the pen 12 will not be dragged over the plot in a lower state between vectors and so that plotting of a vector will not be commenced if the pen 12 has not yet achieved its lowered position in contact with the plotting media.

As with any electro-mechanical type of device, more sensors mean higher cost of manufacture and more opportunity for failure.

Wherefore, it is the object of this invention to provide a dual function sensor for a pen plotter which will sense both pen up and down as well as pen presence in the plotting head.

SUMMARY

The foregoing object has been attained in a pen plotter having a plotting head carrying one half of a pen exchanging mechanism including a holding plate pivotally attached to a plotting head for pivotal movement to raise and lower a pen gripped therein and carried thereby and a spring-biased gripping finger pivotally carried by the holding plate for releasably holding a pen, by the dual-function sensing apparatus of the present invention for providing a single output signal indicating pen presence and pen up/down position comprising, the holding plate having a rectangular hole therethrough; an optical sensor fixedly mounted below the holding plate and passing through the hole so that the hole moves up and down along the optical sensor as the holding plate is pivoted up and down respectively, the optical sensor comprising a light source and a light detector separated from the light source by a space and having a sensing surface upon which a beam of light from the light source impinges and wherein the level of a signal output from the light detector is a function of the amount of the beam of light impinging on the sensing surface; the gripping finger having a first L-shaped arm extending back from a pivot point of the gripping finger in a plane parallel to the holding plate, a free end of the L-shaped arm comprising a vertical finger perpendicular to the plane; a second L-shaped arm in a plane parallel to the holding plate pivotally mounted at a pivot point across the hole from the pivot point of the gripping finger, a free end of the second L-shaped arm comprising a rectangular blade perpendicular to the plane; bias means for biasing the second L-shaped arm towards the hole and the optical sensor, the second L-shaped arm being sized and positioned such that the rectangular blade moves in and out of the space between the light source and the light detector as the second L-shaped arm is pivoted, the first L-shaped arm being sized and positioned such that the vertical finger impinges against and pushes the second L-shaped arm so that when the gripping finger is not holding a pen the rectangular blade is out of the space and when the gripping finger is holding a pen the rectangular blade is fully inserted into the space, the rectangular blade being sized and positioned such that when the rectangular blade is fully inserted into the space and a pen being held is in a lowered position half of the sensing surface is covered by the rectangular blade and when the pen is raised the sensing surface is covered by the rectangular blade whereby with no pen being held the signal output from the light detector is a maximum possible value, with a pen being held in a lowered position the signal output is at one half the maximum possible value, and with a pen being held in a raised position the signal output is at a minimum possible value.

DESCRIPTION OF THE PREFERRED EMBODIMENT

Figure 1:
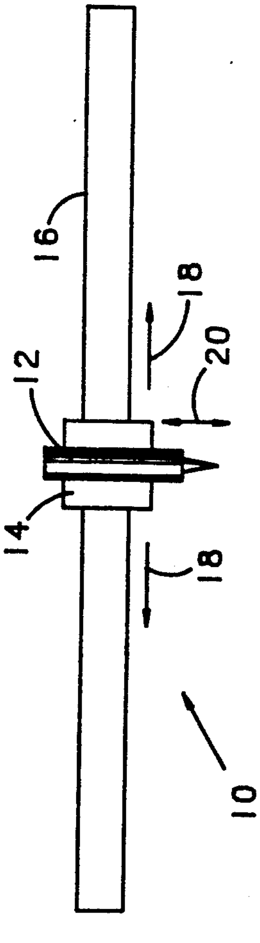
FIG. 1 PRIOR ART
FIG. 1 is a simplified drawing of those portions of a pen plotter of relevance to the present invention.
Figure 2:
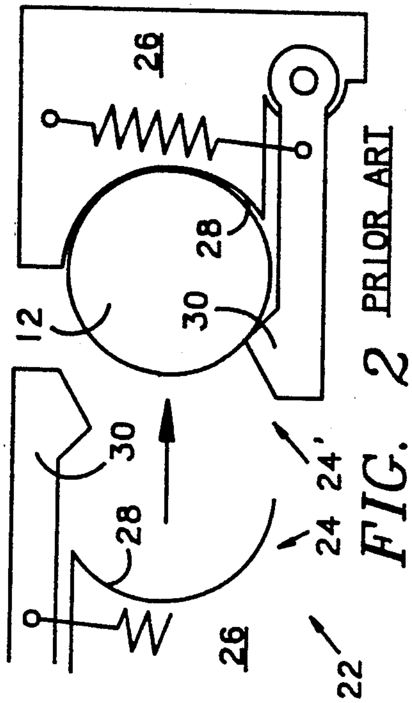
FIG. 2 PRIOR ART
FIG. 2 is a drawing of the pen exchanging mechanism of a prior art pen plotter.
Figure 3:
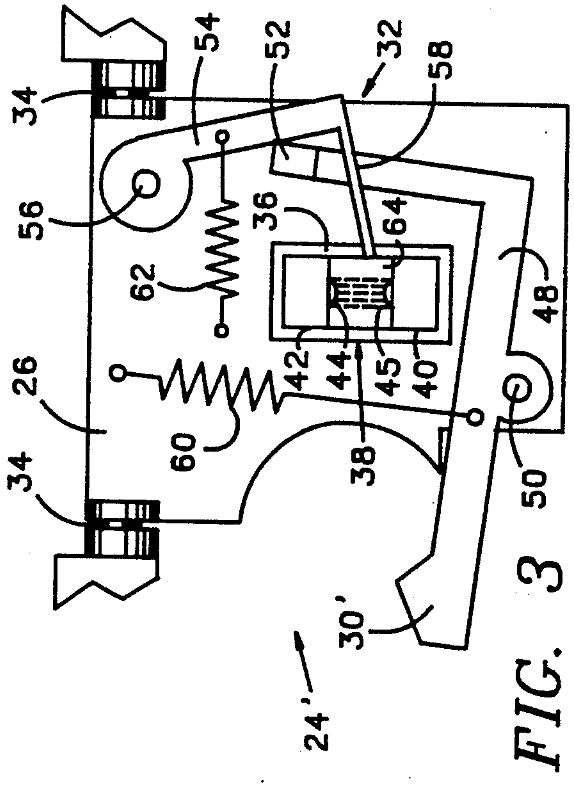
FIG. 3 is a drawing of the plotting head portion of a pen exchanging mechanism for a pen plotter incorporating the present invention therein with no pen being held thereby.
Figure 4:
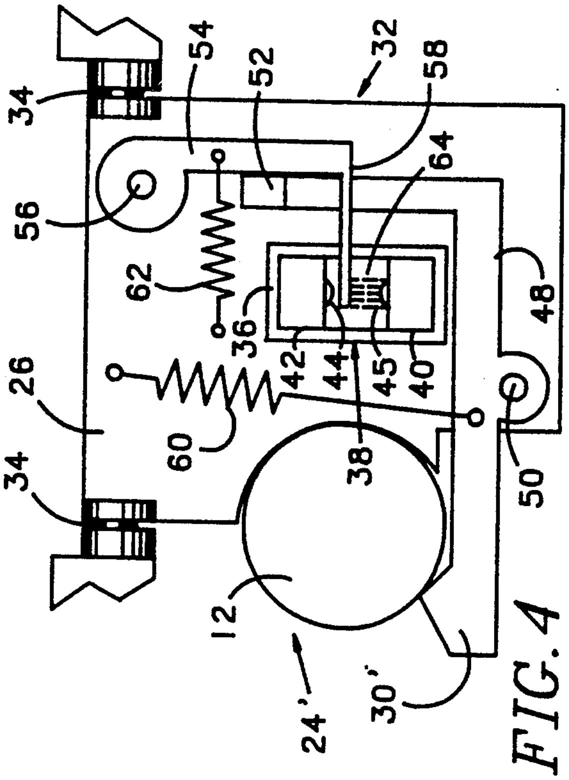
FIG. 4 is a drawing of the plotting heat portion of a pen exchanging mechanism for a pen plotter incorporating the present invention therein holding a pen.
Figure 7:
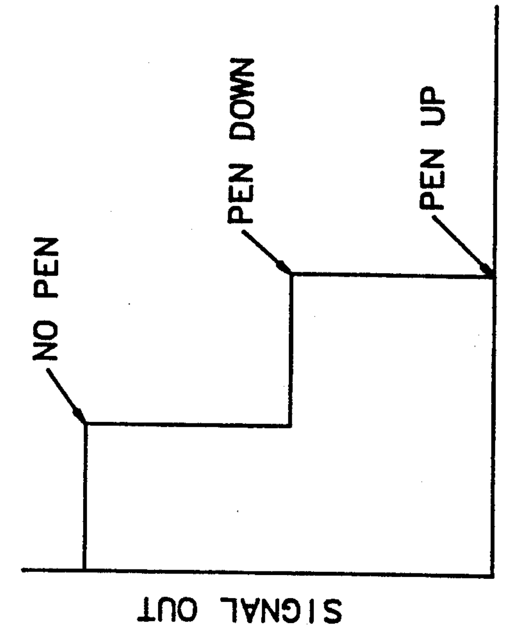
FIG. 7 is a graph showing the three signal levels provided by the dual function sensor of this invention.

The dual function sensing apparatus of the present invention is shown in FIGS. 3–6, where it is generally labelled as 32, and the signal output to the plotting logic is shown in the graph of FIG. 7.

The sensing apparatus 32 is built into the plotting head one half of the pen exchanging mechanism 24'. The holding plate 26 is pivotally attached to the plotting head 14 at 34 for pivotal movement to raise and lower a pen 12 gripped therein and carried thereby. The holding plate 26 has a rectangular hole 36 therethrough through which an optical sensor 38 passes. The optical sensor 38 is fixed below the holding plate 26 so that the hole 36 moves up and down along the optical sensor 38 as the holding plate 26 is pivoted up and down, respectively. The optical sensor 38 comprises a light source 40 and a light detector 42 having a sensing surface 44 upon which a beam of light 45 from the light source 40 is directed. The optical sensor 38 is of a type well known in the art and commercially available from several sources wherein the level of the signal on the output wires 46 is a function of the amount of light impinging on the entirety of the sensing surface 44.

The gripping finger 30' has an L-shaped arm 48 extending back from the pivot point 50. The end of the "L" comprises a vertical finger 52. Another L-shaped arm 54 is pivotally mounted at 56 at the rear of the holding plate 26 across the hole 36 from the pivot point 50. The free end of the L-shaped arm 54 comprises a rectangular blade 58. Just as the gripping finger 30' is biased towards the groove 28 by spring 60, the L-shaped arm 54 is biased towards the hole 36 and optical sensor 38 by a spring 62. As will be noted from the two drawings in FIGS. 3 and 4, the rectangular blade 58 is moved in and out of the space 64 between the light source 40 and the light detector 42 as the L-shaped arm 54 is pivoted by the vertical finger 52 bearing thereagainst. Additionally, it will also be noted from the same drawing figures that the components are sized such that when the gripping finger 30' is not holding a pen 12 as in FIG. 3, the rectangular blade 58 is out of the space 64 and when the gripping finger 30' is holding a pen 12 as in FIG. 4, the rectangular blade 58 is fully inserted into the space 64.

Figure 5:
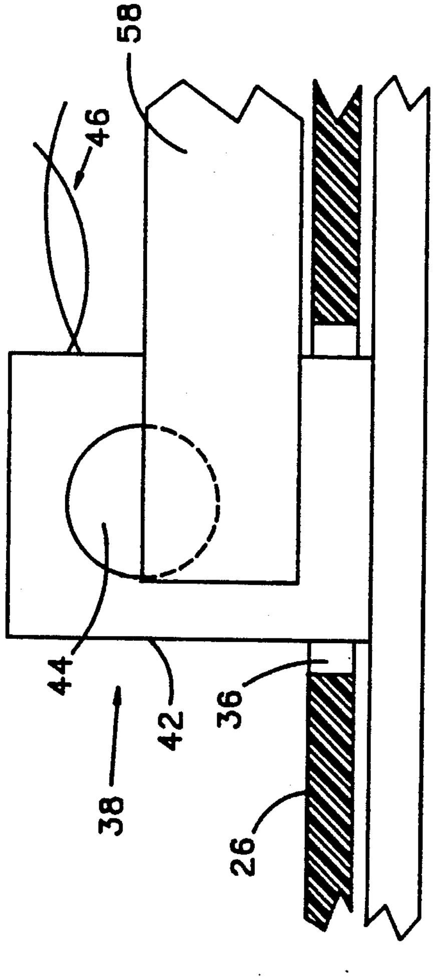
FIG. 5 is a greatly enlarged drawing of the sensor of the present invention in the process of sensing a pen being held in the raised position.
Figure 6:
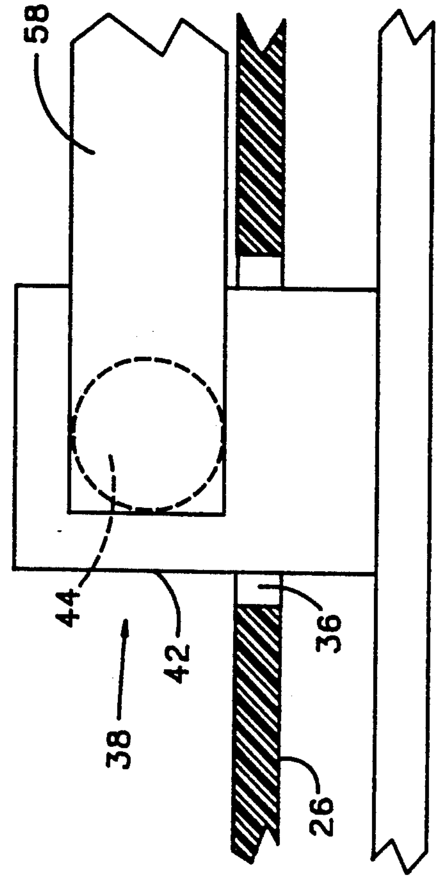
FIG. 6 is a greatly enlarged drawing of the sensor of the present invention in the process of sensing a pen being held in the lowered position.

Turning now to FIGS. 5 and 6, it will be further seen that the components are sized such that when the rectangular blade 58 is fully inserted into the space 64 and the pen 12 being held is in its lowered position as depicted in FIG. 5, half of the sensing surface 44 is covered by the blade 58. When the pen 12 is raised as in FIG. 6, the sensing surface 44 is covered by the blade 58. Thus, the dual function sensing apparatus 32 operates as depicted in the graph of FIG. 7. With no pen 12 being held, the blade 58 is removed from the space 64 and the sensing surface 44 receives all the light from the source 40 and the signal output is a maximum. With a pen 12 being held in the lowered position, the blade 58 is in the space 64 and the sensing surface 44 receives only half the light from the source 40 (as depicted in FIG. 5) and the signal output is at one half its maximum level. With a pen 12 being held in the raised position, the blade 58 is in the space 64 and the sensing surface 44 receives no light from the source 40 (as depicted in FIG. 6) and the signal output is at its minimum level.

Thus, it can be seen from the foregoing description and accompanying drawings that the present invention as truly met is stated objective by providing a sensing apparatus for a pen plotter which can provide indication of two function, i.e. pen up/down position and pen presence.

Wherefore, having thus described the present invention, what is claimed is:

1. In a pen plotter having a plotting head carrying one half of a pen exchanging mechanism including a holding plate pivotally attached to a plotting head for pivotal movement to raise and lower a pen gripped therein and carried thereby and a spring-biased gripping finger pivotally carried by the holding plate for releasably holding a pen, dual-function sensing apparatus for providing a single output signal indicating pen presence and pen up/down position comprising:

a) the holding plate having a rectangular hole therethrough;

b) an optical sensor fixedly mounted below the holding plate and passing through said hole so that said hole moves up and down along said optical sensor as the holding plate is pivoted up and down respectively, said optical sensor comprising a light source and a light detector separated from said light source by a space and having a sensing surface upon which a beam of light from said light source impinges and wherein the level of a signal output from said light detector is a function of the amount of said beam of light impinging on said sensing surface;

c) the gripping finger having a first L-shaped arm extending back from a pivot point of the gripping finger in a plane parallel to the holding plate, a free end of said L-shaped arm comprising a vertical finger perpendicular to said plane;

d) a second L-shaped arm in a plane parallel to the holding plate pivotally mounted at a pivot point across said hole from said pivot point of the gripping finger, a free end of the second L-shaped arm comprising a rectangular blade perpendicular to said plate;

e) bias means for biasing said second L-shaped arm towards said hole and said optical sensor, said second L-shaped arm being sized and positioned such that said rectangular blade moves in and out of said space between said light source and said light detector as said second L-shaped arm is pivoted, said first L-shaped arm being sized and positioned such that said vertical finger impinges against and pushes said second L-shaped arm so that when the gripping finger is not holding a pen said rectangular blade is out of said space and when the gripping finger is holding a pen said rectangular blade is fully inserted into said space, said rectangular blade being sized and positioned such that when said rectangular blade is fully inserted into said space and a pen being held is in a lowered position half of said sensing surface is covered by said rectangular blade and when said pen is raised said sensing surface is covered by said rectangular blade whereby with no pen being held said signal output from said light detector is a maximum possible value, with a pen being held in a lowered position said signal output is at one half said maximum possible value, and with a pen being held in a raised position said signal output is at a minimum possible value.

2. In a pen plotter having a plotting head carrying one half of a pen exchanging mechanism including a holding plate pivotally attached to a plotting head for pivotal movement to raise and lower a pen gripped therein and carried thereby and a spring-biased gripping finger pivotally carried by the holding plate for releasably holding a pen, dual-function sensing apparatus for providing a single output signal indicating pen presence and pen up/down position comprising:

a) an optical sensor fixedly mounted with respect to the holding plate, said optical sensor comprising a light source and a light detector separated from said light source by a space and having a sensing surface upon which a beam of light from said light source impinges and wherein the level of a signal output from said light detector is a function of the amount of said beam of light impinging on said sensing surface;

b) a rectangular blade carried by the holding plate; and, c) pivoting means carried by the holding plate and connected to the gripping finger and said rectangular blade for when the gripping finger is not holding a pen moving said rectangular blade out of said space and when the gripping finger is holding a pen moving said rectangular blade to be fully inserted into space, said rectangular blade being sized and positioned such that when said rectangular blade is fully inserted into said space and a pen being held is in a lowered position half of said sensing surface is covered by said rectangular blade and when said pen is raised said sensing surface is covered by said rectangular blade whereby with no pen being held said signal output from said light detector is a maximum possible value, with a pen being held in a lowered position said signal output is at one half said maximum possible value, and with a pen being held in a raised position said signal output is at a minimum possible value.

3. In a pen plotter having a plotting head carrying one half of a pen exchanging mechanism including a holding plate pivotally attached to a plotting head for pivotal movement to raise and lower a pen gripped therein and carried thereby and a spring-biased gripping finger pivotally carried by the holding plate for releasably holding a pen, dual-function sensing apparatus for providing a single output signal indicating pen presence and pen up/down position comprising:

a) an optical sensor fixedly mounted with respect to the holding plate, said optical sensor comprising a light source and a light detector separated from said light source by a space and having a sensing surface upon which a beam of light from said light source impinges and wherein the level of a signal output from said light detector is a function of the amount of said beam of light impinging on said sensing surface;

b) light blocking means carried by the holding plate for selectively blocking portions of said beam of light; and, c) pivoting means carried by the holding plate and connected to the gripping finger and said light blocking means for when the gripping finger is not holding a pen moving said light blocking means out of said space and when the gripping finger is holding a pen moving said light blocking means into said space, said light blocking means being sized and positioned such that when said light blocking means is inserted into said space and a pen being held is in a lowered position half of said sensing surface is covered by said light blocking means and when said pen is raised said sensing surface is covered by said light blocking means whereby with no pen being held said signal output from said light detector is a maximum possible value, with a pen being held in a lowered position said signal output is at one half said maximum possible value, and with a pen being held in a raised position said signal output is at a minimum possible value.

4. In a pen plotter having a plotting head carrying one half of a pen exchanging mechanism including a holding plate pivotally attached to a plotting head for pivotal movement to raise and lower a pen gripped therein and carried thereby and a spring-biased gripping finger pivotally carried by the holding plate for releasably holding a pen, dual-function sensing apparatus for providing a single output signal indicating pen presence and pen up/down position comprising:

a) an optical sensor comprising a light source and a light detector separated from said light source by a space and having a sensing surface upon which a beam of light from said light source impinges and wherein the level of a signal output from said light detector is a function of the amount of said beam of light impinging on said sensing surface;

b) light blocking means for selectively blocking portions of said beam of light; and, c) activation means connected between the gripping finger and said light blocking means for selectively blocking portions of said beam of light with said light blocking means so that with no pen being held said signal output from said light detector is a first possible value, with a pen being held in a lowered position said signal output is a second possible value, and with a pen being held in a raised position said signal output is a third possible value.

* * * * *